(12) United States Patent
Grice

(10) Patent No.: US 10,436,213 B2
(45) Date of Patent: Oct. 8, 2019

(54) ACTUATION SYSTEM FOR VARYING BLADE PITCH

(71) Applicant: ROLLS-ROYCE plc, London (GB)

(72) Inventor: Christopher M Grice, Burton-upon-Trent (GB)

(73) Assignee: ROLLS-ROYCE PLC, London (GB)

( * ) Notice: Subject to any disclaimer, the term of this patent is extended or adjusted under 35 U.S.C. 154(b) by 231 days.

(21) Appl. No.: 15/409,330

(22) Filed: Jan. 18, 2017

(65) Prior Publication Data
US 2017/0218974 A1 Aug. 3, 2017

(30) Foreign Application Priority Data
Feb. 2, 2016 (GB) .................................. 1601862.4

(51) Int. Cl.
F04D 29/36 (2006.01)
F01D 7/00 (2006.01)
(Continued)

(52) U.S. Cl.
CPC ............ F04D 29/362 (2013.01); B64C 11/38 (2013.01); B64C 11/385 (2013.01); B64C 11/44 (2013.01);
(Continued)

(58) Field of Classification Search
CPC . F01D 7/00; F02K 7/763; F02K 1/763; F02K 1/766; F04D 29/362; F05D 2260/74; F05D 2260/84; F05D 2260/75; F05D 2260/76; B64C 11/38; B64C 11/44; B64C 11/06; B64C 11/30; B64C 11/303; B64C 11/305; B64C 11/325; B64C 11/32; B64C 11/34
(Continued)

(56) References Cited

U.S. PATENT DOCUMENTS 4,591,313 A 5/1986 Miyatake et al.
4,732,538 A * 3/1988 Wollenweber .......... F01D 5/084
416/129

(Continued)

FOREIGN PATENT DOCUMENTS

EP 2384967 A2 11/2011
EP 2 889 453 A1 7/2015

OTHER PUBLICATIONS

Jul. 14, 2016 Search Report issued in British Patent Application No. 1601862.4.
(Continued)

Primary Examiner — Kenneth Bomberg
Assistant Examiner — Andrew Thanh Bui
(74) Attorney, Agent, or Firm — Oliff PLC

(57) ABSTRACT

An actuation system is provided for varying the pitch of the blades of a variable pitch fan or propeller. The actuation system includes a first actuator and a second actuator. The actuation system further includes a first linkage which operably connects the first actuator to the blades such that operation of the first actuator varies the pitch of the blades via the first linkage. The actuation system further includes a second linkage which operably connects the second actuator to the first actuator such that operation of the second actuator varies the pitch of the blades by series connection of the second linkage to the first linkage.

14 Claims, 3 Drawing Sheets

(51) Int. Cl.
| | |
|---|---|
| *F04D 27/02* | (2006.01) |
| *F04D 29/32* | (2006.01) |
| *B64C 11/38* | (2006.01) |
| *B64C 11/44* | (2006.01) |
| *F04D 29/38* | (2006.01) |
| *B64C 11/06* | (2006.01) |

(52) U.S. Cl.
CPC .......... *F01D 7/00* (2013.01); *F04D 27/0246* (2013.01); *F04D 27/0292* (2013.01); *F04D 29/323* (2013.01); *F04D 29/325* (2013.01); *F04D 29/38* (2013.01); *B64C 11/06* (2013.01); *F05D 2220/36* (2013.01); *F05D 2260/84* (2013.01); *F05D 2270/094* (2013.01); *F05D 2270/46* (2013.01); *F05D 2270/62* (2013.01); *F05D 2270/64* (2013.01); *Y02T 50/671* (2013.01)

(58) Field of Classification Search
USPC .............................................. 416/168 A, 165
See application file for complete search history.

(56) References Cited

U.S. PATENT DOCUMENTS

| | | | |
|---|---|---|---|
| 4,934,901 A * | 6/1990 | Duchesneau | B64C 11/32 415/129 |
| 5,199,850 A | 4/1993 | Carvalho et al. | |
| 8,753,084 B2 * | 6/2014 | Morgan | B64C 11/325 416/156 |
| 2012/0090311 A1 | 4/2012 | Le Coq et al. | |

OTHER PUBLICATIONS

Jul. 3, 2017 Search Report issued in European Patent Application No. 17151319.5.

* cited by examiner

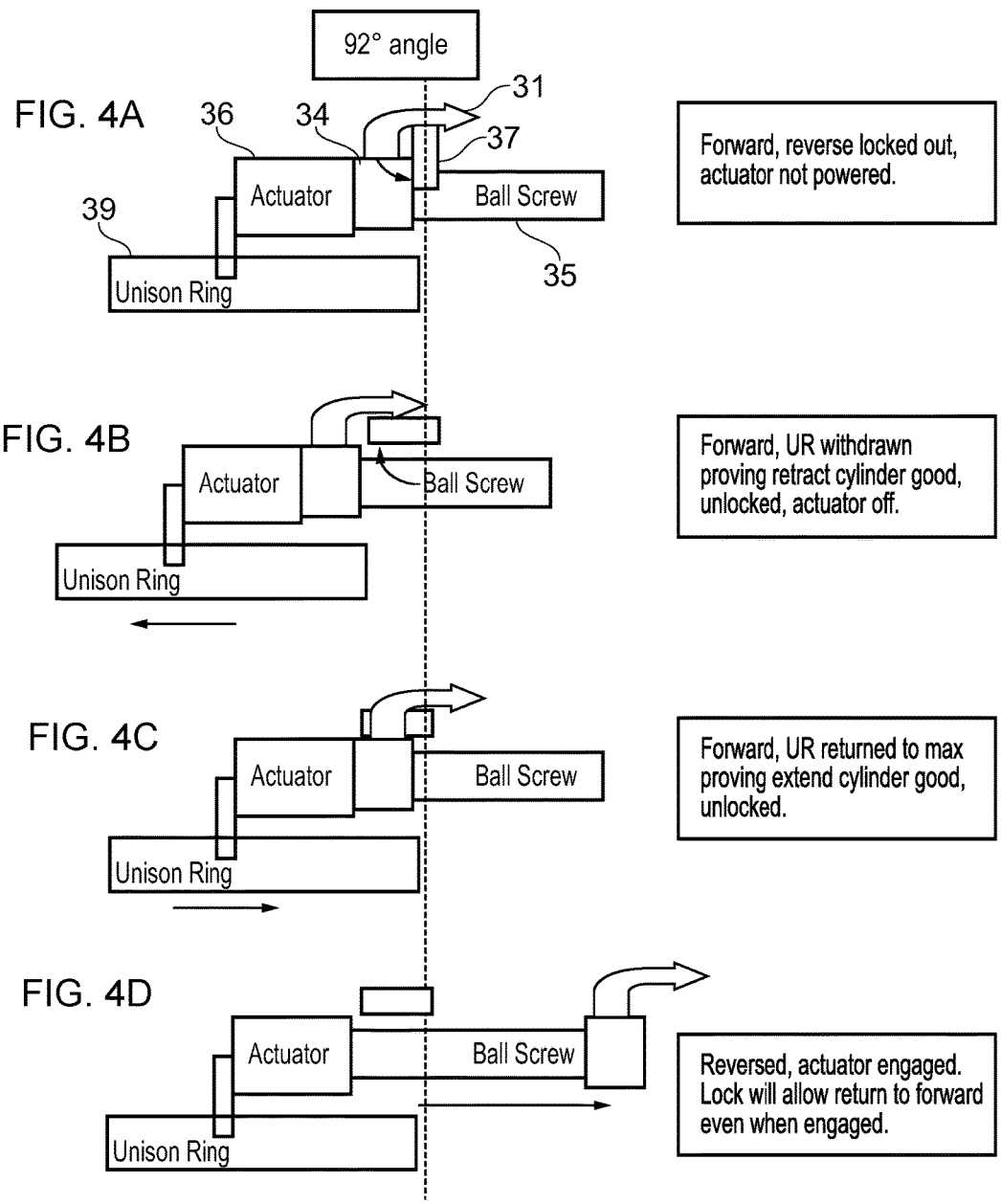

ACTUATION SYSTEM FOR VARYING BLADE PITCH

FIELD OF THE INVENTION

The present invention relates to an actuation system for varying the pitch of the blades of a variable pitch fan or propeller.

BACKGROUND

Variable pitch propeller blades are commonly used on propeller-driven aircraft. They allow the propellers to adapt to different thrust levels and air speeds, thereby improving the propulsion system's efficiency.

Variable pitch fan blades have also been proposed for turbofan engines. For example, the Rolls-Royce M45SD-02 engine described in Flight International, 19 Apr. 1973, pages 615-618 had a variable pitch fan. Advantages of such engines include: reduced noise levels because of ability to lower fan tip speeds, rapid thrust response, possibility of producing thrust reversal without the weight and maintenance penalty of more conventional thrust reversers, high ratio of take-off to cruise thrust, good cycle efficiency and specific fuel consumption, and wide engine operating margins.

However, a problem with implementing variable pitch blades is that there must be adequate safety features to mitigate against possible failures. This is particularly the case with variable pitch systems incorporating thrust reversal. For example, the overlapping blade nature of modern low pressure fans means it is not physically possible to lower the blade pitch through zero pitch to a negative angle. In any event, a transition from a positive to a negative pitch angle (even if possible) would carry a risk of fan overspeed. Accordingly, the only realistic option with such engines is to increase pitch angle through the feather angle at about 90°, to achieve reverse thrust at around 150°. However, without adequate safety features if the primary actuation fails, the blade angle will either decrease resulting in rotor overspeed, or increase to give reverse thrust, depending on which side of zero resultant fan torque the fan is at the point of failure. Failure to the reverse thrust position will result in the end of a flight. Failure to fine pitch will result in fan overspeed, with possible consequences of blade release and loss of the engine function.

It is thus desirable to provide a reliable actuation system for varying blade pitch which is tolerant of faults in the system.

SUMMARY

Accordingly, in a first aspect, the present invention provides an actuation system for varying the pitch of the blades of a variable pitch fan or propeller, the actuation system including:
 a first actuator;
 a second actuator;
 a first linkage which operably connects the first actuator to the blades such that operation of the first actuator varies the pitch of the blades via the first linkage; and
 a second linkage which operably connects the second actuator to the first actuator such that operation of the second actuator varies the pitch of the blades by series connection of the second linkage to the first linkage.

By providing two actuators and connecting the two linkages in series, the system can implement safety features and operating procedures which reduce the risk of flight-endangering system failures. In particular, each actuator can be operated to override the other, mitigating the risk of safety critical situations developing in the event of failure or malfunction of one of the actuators.

In a second aspect, the present invention provides an aeroengine having a variable pitch fan or propeller, and an actuation system according to the first aspect for varying the pitch of the blades of the fan or propeller. For example, the engine can be gas turbine engine, and in particular the engine can be a ducted fan gas turbine engine having a variable pitch fan.

Optional features of the invention will now be set out. These are applicable singly or in any combination with any aspect of the invention.

One of the first and second actuators may be hydraulically powered and the other of the first and second actuators may be electrically powered. In this way, the risk of both actuators failing simultaneously can be reduced.

The first actuator may be switchable between a stowed configuration in which it is inoperable and set at a position corresponding to zero pitch variation by the first actuator, and an active configuration in which it is operable. For example, the first actuator can be unpowered in the stowed configuration and powered in the active configuration. When the first actuator is in its stowed configuration, the second actuator may be operable to vary the pitch of the blades over a forward range of angles causing the fan or propeller to produce differing amounts of forward thrust, an end point of the range being a blade angle corresponding to a boundary between forward thrust and reverse thrust, e.g. the end point can be the blades' feather point angle at which the blades produce minimum drag. Then, when the second actuator is at an operative position corresponding to the end point of the forward range, and the first actuator is switched to its active configuration, the first actuator may be operable to vary the pitch of the blades over a reverse range of angles causing the fan or propeller to produce differing amounts of reverse thrust. Thus, if the first actuator fails or malfunctions when the blades are angled to produce reverse thrust, the second actuator can be used to override the first actuator and return the blades to an angle producing forward thrust. Conversely, if the second actuator fails or malfunctions when the blades are angled at a fine pitch to produce low amounts of forward thrust, the first actuator can be used to override the second actuator and return the blades to a higher angle, forward thrust pitch.

The system may further have a locking mechanism which is movable between a closed position and an open position, wherein when the locking mechanism is in its closed position the system is prevented from varying the pitch of the blades beyond a predetermined angle, and only when the locking mechanism is in its open position is the system able to vary the pitch of the blades beyond the predetermined angle. The predetermined angle typically corresponds to a boundary between forward thrust and reverse thrust (the angle can be the blades' feather point angle at which the blades produce minimum drag). Thus the mechanism can prevent the actuators rotating the blades from a forward thrust angle through the feather point angle to a reverse thrust angle. In particular, when the first actuator is used for producing reverse thrust, the locking mechanism can prevent inadvertent operation of the first actuator. Similarly, because the second and first linkages are series connected, the locking mechanism can prevent the second actuator from inadvertently over-extending, e.g. beyond the above-mentioned operative position corresponding to the end point of the forward range, and accidentally producing reverse thrust.

When the second actuator is at its end point operative position (corresponding to the end point of the forward range), the locking mechanism may be prevented from moving from its closed position to its open position. Requiring that the second actuator be moved away from its end of range position before the locking mechanism is opened can provide confirmation that the second actuator is operating correctly and able to override the first actuator should that be necessary.

Conveniently, the first actuator may include a plurality of ball screw arrangements and the first linkage may include a plurality of linkage portions, each linkage portion connecting a respective one of the ball screw arrangements to a respective one of the blades. For example, each linkage portion may include a quill which extends radially inwardly from the inboard end of the respective blade and a crank arm joined to an end of the quill, the crank arm being movable by the respective ball screw arrangement to rotate the quill and thereby vary the pitch of the respective blade.

Conveniently, the second linkage may include a unison ring.

BRIEF DESCRIPTION OF THE DRAWINGS

Embodiments of the invention will now be described by way of example with reference to the accompanying drawings in which:

FIGS. 4A, 4B, 4C and 4D show schematically stages in the operation of the actuation system of FIG. 3.

DETAILED DESCRIPTION AND FURTHER OPTIONAL FEATURES

Figure 1:
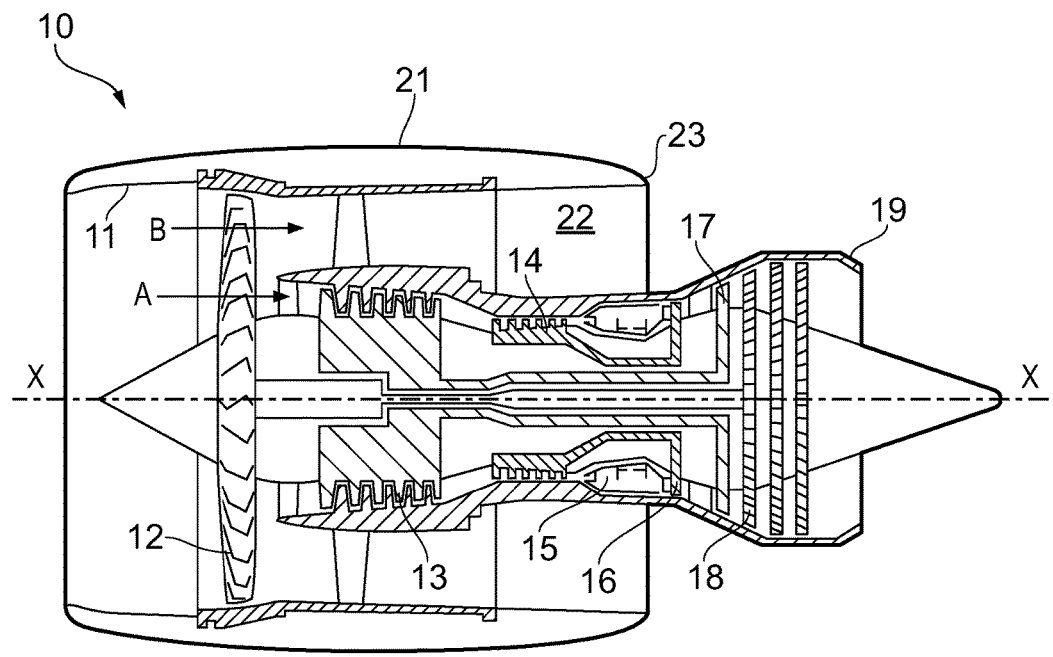
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
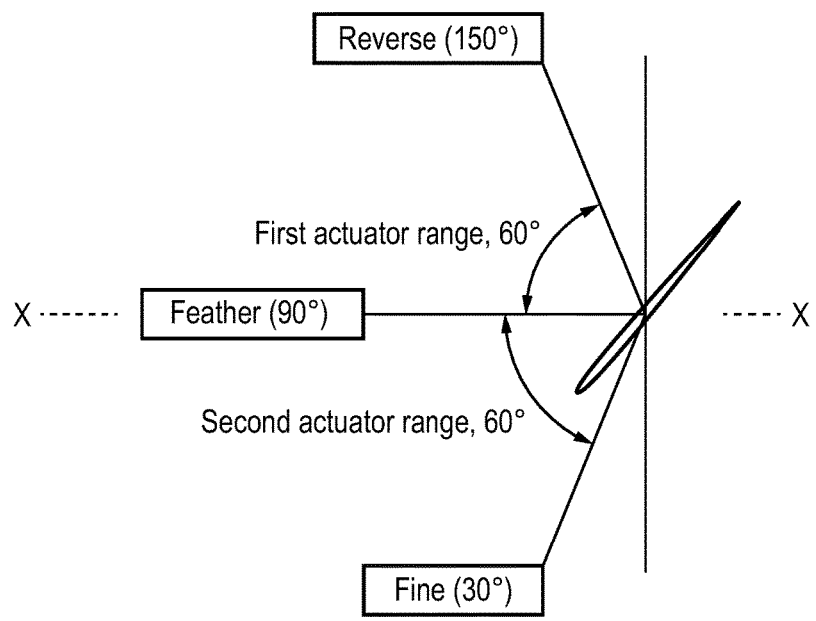
FIG. 2 shows schematically fan blade pitch variation.

The engine also includes an actuation system for varying the pitch of the blades of the fan 12. FIG. 2 shows schematically the range of pitch variation of each blade. In the "fine" range from about 30° to about 40° the engine can be run at high speed while producing relatively low forward thrust, thereby providing the aircraft with good short field performance. The "normal" range from about 40° to about 85° also produces forward thrust, and allows the engine to be aero-optimised for a given flight condition and for enhanced specific fuel consumption (a conventional, non-variable pitch fan typically has its blades set at an angle of about 40°). The range from about 85° to about 92° contains the feather point angle at which the blades produce minimum drag. The "reverse" range from about 92° to about 150° provides reverse thrust, such that the engine can be operated without a conventional thrust reversal unit.

Figure 3:
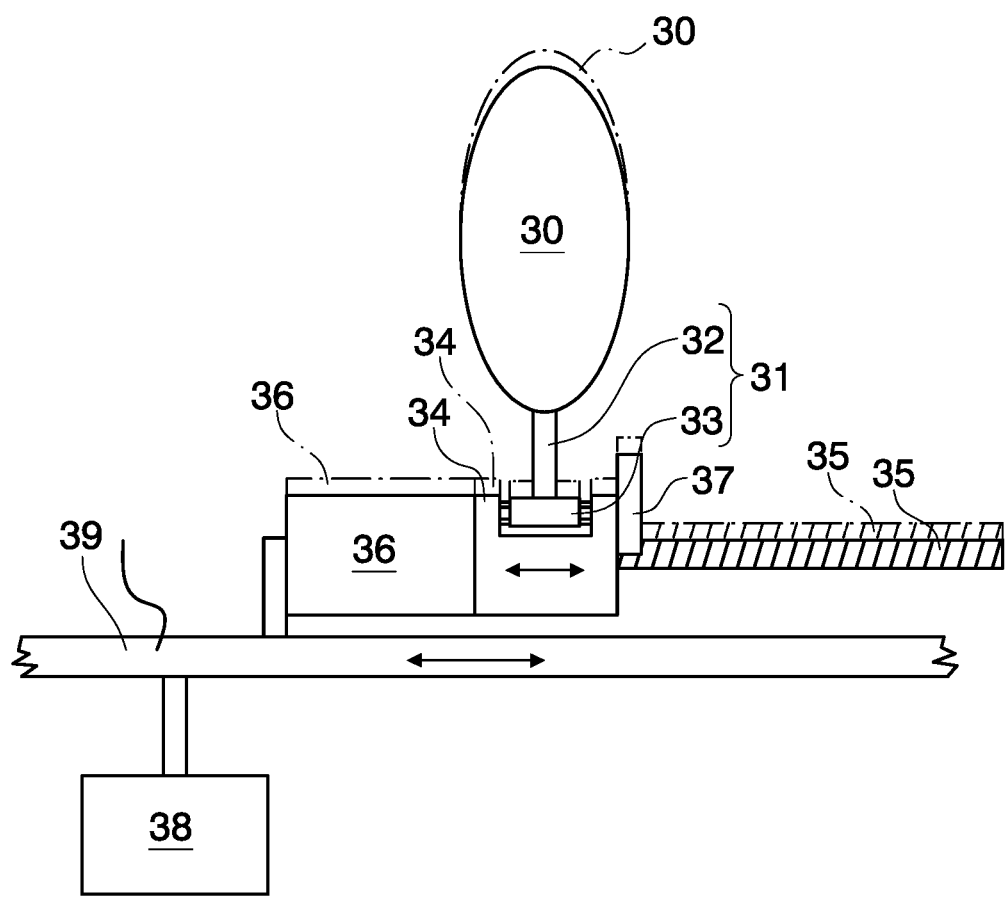
FIG. 3 shows schematically an actuation system for varying the pitch of the blades.

FIG. 3 shows schematically the actuation system. Each fan blade 30 has a respective linkage portion 31 comprising a quill 32 which extends radially inwardly from the inboard end of the fan blade and a crank arm 33 joined at one end to the quill and having its other end in a respective retaining recess formed in a nut portion 34 of a ball screw 35. An electrical motor 36 is operable to rotate the screw and thereby produce linear motion of the nut portion. Similar linkage portions and electrically-powered ball screw arrangements (i.e., nut portion 34 and ball screw 35) are provided for the other blades of the fan 12. The plural linkage portions form a first linkage and the plural ball screw arrangements form a first actuator, such that operation of the first actuator varies the pitch of the blades via the first linkage.

The first actuator has an active configuration in which the motor 36 is powered and capable of operating the linkage portion 31, and a stowed configuration in which it is unpowered and thus inoperable and in which it is set at a zero position (shown in FIG. 3) corresponding to zero pitch variation by the first actuator.

The actuation system further has a second, hydraulically-powered actuator 38. This is operably connected to a second linkage which includes a unison ring 39. The unison ring joins the second actuator to the ball screw arrangements of the first actuator, such that operation of the second actuator translates the unison ring, which in turn moves the ball screw arrangements (and in particular the nut portions 34 of the arrangements) and as a result varies the pitch of the blades. In other words, the series connection of the second linkage to the first linkage allows the second actuator to vary the blade pitch via the first linkage.

The second actuator 38 can be of dual cylinder type, known in the art, having an extend cylinder which is pressurised to move the unison ring 39 in a direction to increase the blade angle and an opposing retract cylinder which is pressurised to move the unison ring 39 in a direction to reduce the blade angle.

As indicated in FIG. 2, the second actuator is used for producing forward thrust with blade angles in the range from about 30° to about 90°, and the first actuator is used for producing reverse thrust with blade angles in the range from about 90° to about 150°. Thus each actuator has a similar operating range, in this case of about 60°. Under normal use (i.e. when not being used to override the second actuator), the first actuator is only operated to produce reverse thrust when the second actuator is at its end point operative position (corresponding to a blade angle of 90°).

An additional safety feature is provided in the form of a locking mechanism 37 movable between a closed position (shown in FIG. 3) and an open position. Only when the locking mechanism is in its open position can the actuators rotate the blades from a forward thrust angle through 90° to a reverse thrust angle. In particular, even if the first actuator is active it cannot vary the blade pitch if it is at its zero position and the locking mechanism is closed.

FIGS. 4(a) to (d) show schematically stages in the operation of the actuation system to engage reverse thrust. In FIG. 4(a), the first actuator is in its unpowered, stowed configuration at its zero position and the locking mechanism 37 is closed. Each of these features prevents the second actuator from varying the blade angle beyond the feather point angle of about 90°. With the first actuator stowed, the second actuator can vary the blade angle over the full range of forward thrust angles from 30° up to the feather point, although FIG. 4(a) shows the unison ring at its end of range operative position adjacent the locking mechanism (second actuator fully extended) such that the blade angle is at the feather point.

This is the first stage for engagement of reverse thrust. FIGS. 4(b) and (c) then show subsequent stages. As shown in FIG. 4(b), the second actuator withdraws the unison ring 39 away from its end of range position adjacent the locking mechanism. This produces space to allow the locking mechanism to be rotated from its closed position to its open position. It also provides confirmation that the retract cylinder of the second actuator is functioning correctly, which is vital for overriding the first actuator in the event of first actuator failure. Next (FIG. 4(c)), the second actuator re-extends the unison ring 39 to its end of range operative position. This provides confirmation that the extend cylinder of the second actuator is functioning correctly. Having obtained these two confirmations the first actuator can be engaged (FIG. 4(d)), producing reverse thrust. However, the locking mechanism, being open, allows the second actuator, if necessary, to override the first actuator and return the blades to the "normal" forward thrust range. In this way, the system provides a safety mechanism in the event of malfunction of the first actuator when the blade angles are in the "reverse" range. Conversely, if the second actuator malfunctions when the blade angles are in the "fine" range, the first actuator can override the second actuator and return the blades to the "normal" range.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An actuation system varying a pitch of a plurality of blades of a variable pitch fan or propeller, the actuation system including:
   a first actuator;
   a second actuator;
   the plurality of blades;
   a lock which is movable between a closed position and an open position;
   a first linkage which operably connects the first actuator to the blades such that operation of the first actuator varies the pitch of the blades via the first linkage; and
   a second linkage which operably connects the second actuator in series connection to the first actuator such that operation of the second actuator varies the pitch of the blades by series connection of the second linkage to the first linkage, the actuation system being configured to:
   switch the first actuator between a stowed configuration in which the first actuator is unpowered, inoperable, and set at a position corresponding to zero pitch variation of the blades by the first actuator, and an active configuration in which the first actuator is powered and operable,
   when the first actuator is in the stowed configuration, operate the second actuator to vary the pitch of the blades over a forward range of angles causing the fan or propeller to produce differing amounts of forward thrust,
   set an end point of the forward range at a blade angle corresponding to a boundary between forward thrust and reverse thrust,
   when the second actuator is at an operative position corresponding to the end point of the forward range, and the first actuator is switched to the active configuration, operate the first actuator to vary the pitch of the blades over a reverse range of angles causing the fan or propeller to produce differing amounts of reverse thrust,
   when the lock is in its closed position, prevent the blades from varying the pitch beyond a predetermined angle; and
   only when the lock is in its open position, vary the pitch of the blades beyond the predetermined angle.

2. The actuation system according to claim 1, wherein one of the first and second actuators is hydraulically powered and the other of the first and second actuators is electrically powered.

3. The actuation system according to claim 2, wherein the first actuator includes a plurality of ball screw arrangements and the first linkage includes a plurality of linkage portions, each linkage portion connecting a respective one of the ball screw arrangements to a respective one of the blades.

4. The actuation system according to claim 3, wherein each linkage portion includes a quill which extends radially inwardly from the inboard end of the respective blade and a crank arm joined to an end of the quill, the crank arm being movable by the respective ball screw arrangement to rotate the quill and thereby vary the pitch of the respective blade.

5. The actuation system according to claim 2, wherein the second linkage includes a unison ring.

6. An aeroengine having the variable pitch fan or propeller, and the actuation system according to claim 2 for varying the pitch of the blades of the fan or propeller.

7. The aeroengine according to claim 6 which is a ducted fan gas turbine engine having the variable pitch fan.

8. The actuation system according to claim 1, wherein the predetermined angle corresponds to the boundary between forward thrust and reverse thrust.

9. The actuation system according to claim 1, wherein when the second actuator is at its end point operative position, the lock is prevented from moving from its closed position to its open position.

10. The actuation system according to claim 1, wherein the first actuator includes a plurality of ball screw arrangements and the first linkage includes a plurality of linkage portions, each linkage portion connecting a respective one of the ball screw arrangements to a respective one of the blades.

11. The actuation system according to claim 10, wherein each linkage portion includes a quill which extends radially inwardly from an inboard end of the respective blade and a crank arm joined to an end of the quill, the crank arm being movable by the respective ball screw arrangement to rotate the quill and thereby vary the pitch of the respective blade.

12. The actuation system according to claim 1, wherein the second linkage includes a unison ring.

13. An aeroengine having the variable pitch fan or propeller, and the actuation system according to claim 1 for varying the pitch of the blades of the fan or propeller.

14. The aeroengine according to claim 13 which is a ducted fan gas turbine engine having the variable pitch fan.

* * * * *